Aug. 19, 1947.    W. K. SPROULE ET AL    2,425,760
PROCESS FOR CONCENTRATING PLATINUM GROUP METALS AND GOLD
Filed June 28, 1945
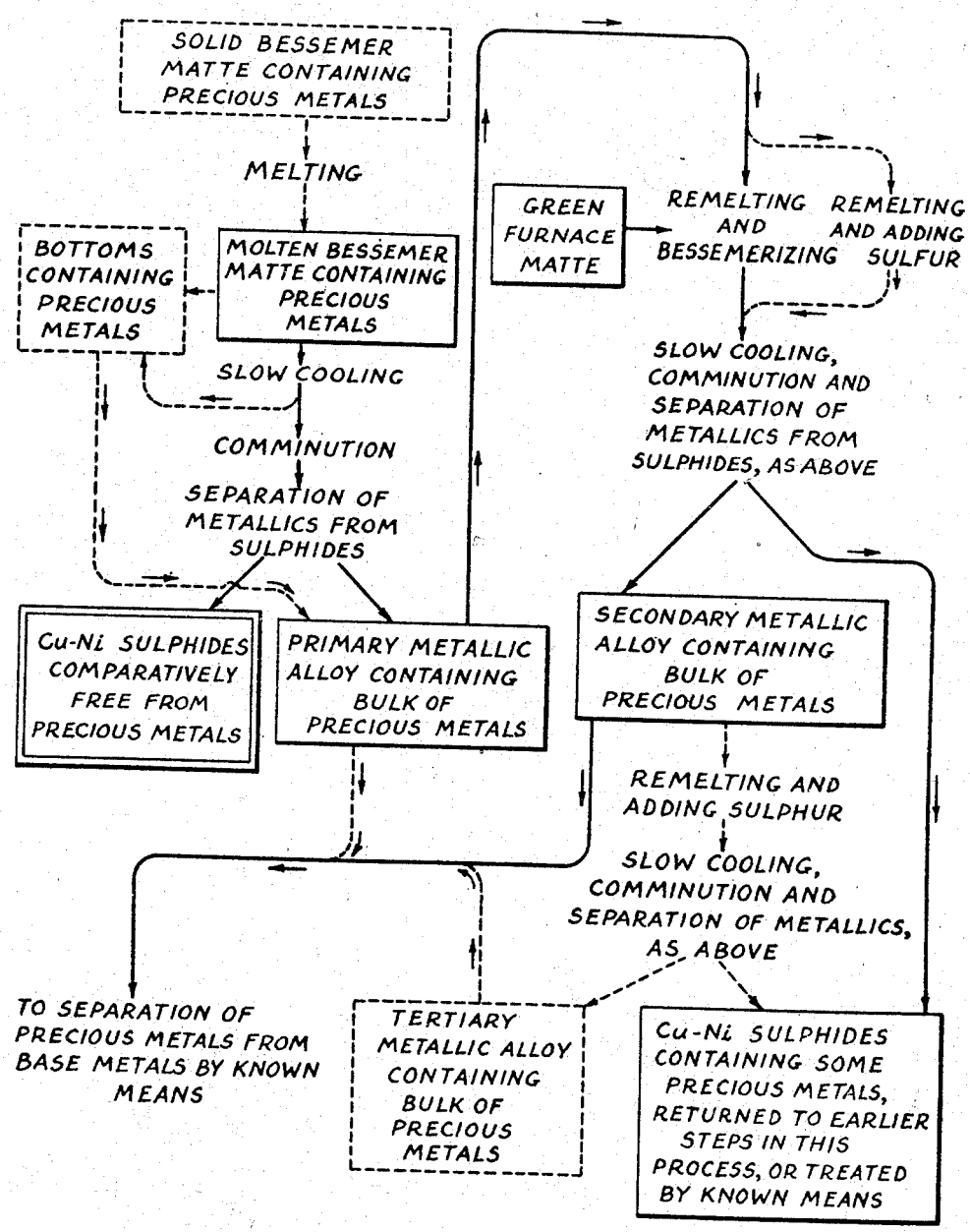
INVENTORS.
WILLIAM KELVIN SPROULE
GEORGE ALAN HARCOURT
BY
ATTORNEY.

Patented Aug. 19, 1947

2,425,760

UNITED STATES PATENT OFFICE 2,425,760

PROCESS FOR CONCENTRATING PLATINUM GROUP METALS AND GOLD

William Kelvin Sproule and George Alan Harcourt, Copper Cliff, Ontario, Canada, assignors to The International Nickel Company, Inc., New York, N. Y., a corporation of Delaware Application June 28, 1945, Serial No. 602,168
In Canada February 28, 1945

10 Claims. (Cl. 75—83)

The present invention relates to a process for recovering platinum group metals and gold present in masses containing predominantly copper, nickel and sulfur, and more particularly to the recovery of these precious metals from copper-nickel mattes.

Heretofore, the metallurgy of ores containing precious metals and sulfides of copper, nickel and other base metals has, in most cases, involved recovery of the precious metals from residues produced by electrolytic or carbonyl refining of the base metals present in the ore. In all other cases, where the precious metals content is insufficient to justify electrolytic or carbonyl refining, the precious metals present in the ore are not recovered. It has now been discovered that in ores comprising predominantly copper, nickel, sulfur and other base metals together with the platinum group metals and gold, these precious metals can be recovered, as well as the base metals copper and nickel, in an economically and metallurgically satisfactory manner, even in cases where it has not heretofore been feasible to recover precious metals.

It is an object of the present invention to provide a process for treating material containing principally copper, nickel and sulfur together with precious metals to concentrate the precious metals in an economically satisfactory manner.

It is within the purview of the present invention to provide a method for treating material containing copper, nickel and sulfur together with precious metals to concentrate the precious metals without recourse to electrolytic or carbonyl refining.

It is within the scope of the present invention to treat ores containing principally copper, nickel, sulfur, iron and precious metals by Bessemerizing and crystallization to separate copper and nickel as sulfides and to concentrate the precious metals without recourse to electrolytic or carbonyl refining.

The present invention likewise contemplates a process for treating Bessemer matte containing principally copper, nickel and sulfur together with precious metals and a small amount of iron to provide a mass in which copper sulfide and nickel sulfide can be separated from precious metals without recourse to electrolytic or carbonyl refining.

Other objects and advantages will become apparent from the following description taken in conjunction with the drawing which is a flowsheet depicting the process of the invention and various modifications thereof.

In our co-pending U. S. application Serial No. 527,510, filed March 21, 1944, there is described a process for the treatment of masses containing copper, nickel and sulfur to obtain crystalline copper sulfide substantially chemically free and mechanically freed from the nickel sulfide, and crystalline nickel sulfide substantially chemically free and mechanically freed from copper sulfide. This process involves a crystallization of the mass containing copper and nickel as sulfide under critical conditions followed by comminution of the crystallized mass to provide a comminuted material in which the crystalline copper sulfide containing not more than about 1% nickel is present substantially mechanically freed from particles of nickel sulfide, and nickel sulfide containing not more than 1% copper is present substantially mechanically freed from particles of copper sulfide.

The foregoing application also discloses that the mechanically freed copper and nickel sulfides may then be separated in any suitable manner such as by magnetic separation, flotation, etc., or any combination of these methods.

In our co-pending U. S. application Serial No. 527,511, filed March 21, 1944, there is disclosed a process for crystallizing and comminuting masses containing copper, nickel and sulfur to obtain copper sulfide in crystalline form mechanically freed from particles of nickel sulfide and nickel sulfide in crystalline form mechanically freed from particles of copper sulfide, and the separation of the copper sulfide from the nickel sulfide by flotation.

In these co-pending applications, it has been clearly disclosed that the processes described therein provide satisfactory results for materials having a wide range of composition not only of copper and nickel but also of sulfur. It has been disclosed in the foregoing co-pending applications that these processes are operative for masses containing as little as 4% sulfur or containing as much as 30% or more sulfur.

We have discovered that metallic grains formed when copper-nickel mattes of certain sulfur contents are solidified contain the bulk of the precious metals present and that by regulated, carefully controlled slow cooling these metallic grains can be caused to grow sufficiently large to permit separation thereof from the slowly cooled mass, for example, by comminution followed by magnetic separation, and to permit the recovery of precious metals from the separated metallic particles in an economical and practical manner.

In order to insure satisfactory recovery of the precious metals, the sulfur content of the mass must be carefully controlled. In general, the molten mass must not contain enough sulfur to combine with all the copper, nickel and other base metals present to form sulfides, such as $Cu_2S$, $Ni_3S_2$ and FeS. Thus, a portion of the metals present must be uncombined with sulfur and appear as metallic particles upon slow cooling of the molten matte. The amount of metallic particles formed will, of course, depend on the sulfur content of the molten mass. If only a small amount of sulfur is present, the slowly cooled mass will comprise a small quantity of sulfides and a large quantity of metallic particles whereas, if an excess of sulfur is present, the base metals will be substantially completely combined with sulfur and no metallic particles will appear in the slowly cooled matte. Theoretically, a mass which consists entirely of copper sulfide ($Cu_2S$) contains 20.14% sulfur and 79.86% copper. Similarly, a mass which consists entirely of nickel sulfide ($Ni_3S_2$) contains 26.70% sulfur and 73.30% nickel. Mixtures of these sulfides will, of course, theoretically contain varying amounts of sulfur between 20.14% and 26.70%. However, in order to recover precious metals from a mass containing copper, nickel and sulfur primarily, the sulfur content must be reduced appreciably below the theoretical sulfur content for a mixture of sulfides corresponding to the copper-nickel content of the material. For example, a mass containing 58.8% $Ni_3S_2$, 39.2% $Cu_2S$ and 2% precious metals theoretically has a sulfur content of 23.6%. In order to recover the precious metals from such a mass, the sulfur content must be reduced below 23.6% and preferably to about 18% to about 22%. That is to say, the percentage of sulfur in the matte must be only from about 75% to about 95% of the amount required to combine with all the copper, nickel and other base metals present.

Those skilled in the art will understand that a mass having a very low sulfur content, e. g. about 1%, will provide a very large quantity of metallics after slow cooling in which a relatively large percentage of the precious metals will appear. However, in such a case, the quantity of metallic particles is so large that the concentration of precious metals therein is not, to a worthwhile degree, greater than that in the original mass. Also, it may not be possible to effectively comminute slowly cooled masses containing less than about 4% to about 8% sulfur. Consequently, for each copper-nickel ratio, there is a minimum sulfur content below which it is not economically practicable to reduce the sulfur content of the mass. The total content of platinum group metals and gold in the matte also is a factor in determining the most economical sulfur content. Furthermore, it has been found that there is a tendency for the platinum metals and gold to concentrate in the finer sizes of the metallic particles. Accordingly, the heat treatment of the mass containing the precious metals must be controlled in such a manner as to ensure that the material wherein the precious metals are concentrated shall be of sufficient size for separation by physical means to be practicable. In general, the sulfur content of the mass should not be reduced below about 80% to about 90% of the sulfur theoretically necessary to combine with the copper and nickel and other base metals, although in masses very rich in platinum metals and gold a lower sulfur content of mattes may be advantageous. If the sulfur content of mattes of certain compositions, for example copper-nickel mattes containing less than about 28% nickel, is reduced sufficiently to result in the formation of a liquid metallic phase immiscible with the liquid sulfide phase, the present process is applicable only to the sulfide phase. In this case, a portion of the precious metals is concentrated into the liquid metallic phase by the so-called "bottoms process," while a further portion can, by the process of the present invention, be concentrated from the sulfide phase.

In general, the present process comprises slowly cooling masses containing copper, nickel, sulfur and precious metals from a temperature at which the mass is substantially liquid down to at least about 950° F. The reduction in temperature of these masses over this temperature range should occur in about one day to about fifteen days to provide optimum results, or at an average rate of about 40° F. per hour to about 3° F. per hour. However, some useful degree of recovery of platinum metals and gold can be obtained after cooling over even shorter periods. Such masses, when cooled in the foregoing manner and then comminuted, consist of grains of copper sulfide substantially chemically free from nickel, i. e., containing about 1% or less of nickel, grains of nickel sulfide substantially chemically free from copper, i. e. containing 1% of copper or less, and copper-nickel alloy grains in which a concentration of the platinum group metals and gold occurs. By mechanically separating the copper-nickel alloy from the sulfides, the platinum metals and gold can be recovered in concentrated form.

For the purpose of giving those skilled in the art a further and better understanding of the invention, the following illustrative examples are given:

*Example I*

Fifteen tons of a copper-nickel Bessemer converter matte were used as a charge which, upon analysis, was found to contain about 18.8% copper, about 57.5% nickel, about 22.8% sulfur, about 0.7% iron, about 2.2 ounces platinum metals and gold per ton, and the remainder silica and other impurities. The amount of sulfur present was about 87.5% of the theoretical amount required to completely sulfidize the matte. Starting at an initial temperature of about 1980° F., the matte was slowly cooled, over a period of about 15 days, to a temperature of about 800° F., that is, at an average rate of about 3⅓° F. per hour, and then comparatively quickly cooled to room temperature. The cooled matte consisted of a mechanical mixture of sulfides and metallics. In other words, the sulfur present combined with the copper, nickel and iron to form sulfides. However, there was not enough sulfur to combine with all the copper, nickel and iron present and, consequently, a portion of these elements was left as metallics in the cooled matte. Due to the slow reduction in temperature during the cooling period, the crystallized metallic grains were of sufficient size that subsequent mechanical separation of the metallics from the sulfides was practical. We have found that this desirable result is obtained when the matte is slowly cooled to a temperature of about 950° F., or lower. Thereafter, the cooling may be slow or rapid.

The slowly cooled matte was crushed and ground until all except the coarser metallic particles passed through a 200-mesh screen and the magnetic metallic particles were separated from the sulfides by magnetic separation. The resulting products were segregated into groups of the following sizes: Larger than 6-mesh, smaller than 6-mesh but larger than 48-mesh, and smaller than 48-mesh. The following tabulation clearly shows that about 95.1% of the platinum group metals and gold was segregated in the magnetic portion, although this portion amounted to only 13.7% of the total weight. It is also apparent that the platinum group metals and gold are more highly concentrated in the finer sizes of the magnetics than in the coarser sizes.

| Mesh | Magnetic Portion | | | Non-Magnetic Portion | | |
|---|---|---|---|---|---|---|
| | Weight, per cent of Total Matte | Assay Oz./ton Au and Pt Metals | Recovery of Au and Pt Metals, per cent | Weight, per cent of Total Matte | Assay Oz./ton Au and Pt Metals | Recovery of Au and Pt Metals, per cent |
| +6 | .4 | 5.50 | 1.0 | 0 | .0 | 0 |
| −6+48 | 7.8 | 12.41 | 43.7 | 0 | 0 | 0 |
| −48 | 5.5 | 20.37 | 50.4 | 86.3 | 0.126 | 4.9 |
| Total | 13.7 | | 95.1 | 86.3 | | 4.9 |
| Overall | | 15.4 | | | 0.126 | |

It is to be understood that the segregation of the matte into different sized fractions was done for illustrative purposes. In ordinary practice, we prefer to crush and grind the slowly cooled matte to such a degree that about 5% to about 50% thereof is retained on a 325-mesh screen. At this time, we separate the magnetic metallic particles from the sulfides by magnetic separation.

The magnetic portion of the matte can be treated in any suitable manner to recover the precious metals and gold therefrom. However, the following method of treatment is preferred when treating mattes obtained from copper-nickel ores:

The magnetic portion consisting principally of a metallic copper-nickel alloy together with platinum group metals and gold is treated with sulfur or sulfur-bearing material in order to convert a portion of the copper and nickel to sulfides. We prefer to add sufficient sulfur at this stage to convert about 80% to about 95% of the metallic portion to sulfides. This sulfiding can be accomplished by melting of the metallics and addition of elemental sulfur or by treatment of the metallics with green furnace matte. If furnace matte is used as a source of sulfur, the melted or fused mixture of furnace matte and metallics is Bessemerized to remove iron and to convert about 80% to about 95% of the metallic portion to sulfides. The sulfidized mass is then slowly cooled and processed as described in connection with the initial treatment of the matte. That is, it is slowly cooled from the molten state, comminuted, and the metallic fraction removed therefrom by magnetic separation. The metallics, after this second treatment, usually contain a sufficient concentration of platinum metals and gold to permit economical recovery thereof, for example in a slime resulting from electrolysis of the above-mentioned metallic fraction. However, if the concentration of precious metals is not sufficiently high after this second treatment, the metallics may again be sulfidized, slowly cooled and processed as described in connection with the initial treatment of the matte.

Thus, we have provided a process for recovery of nickel, copper, gold, silver and platinum group metals individually from the copper-nickel alloy obtained by slow cooling, comminution and magnetic separation of molten matte containing insufficient sulfur to combine with all the copper, nickel and other base metals present. However, it is to be understood that we are not limited to any specific method of recovering the various individual components of the copper-nickel alloy, as our preferred method is quite familiar to those skilled in the art. As previously stated, other suitable methods may be used to recover the precious metals from the metallic fraction resulting from the original treatment of the matte, especially when a high percentage of precious metals is present.

*Example II*

A charge of copper-nickel matte was oxidized with air in a Bessemer converter until the iron content had been reduced to about 1.5%. The sulfur content was then about 22.7% and was somewhat higher than desired. Bessemerization was continued until the sulfur content had been reduced to about 21.5%, or about 83.7% of that theoretically required to completely sulfidize the copper, nickel and iron present. Approximately 6 tons of the aforesaid matte, containing about 26.3% copper, about 51.4% nickel, about .60% iron, about 21.5% sulfur and about 1.48 ounces of platinum group metals and gold per ton, were cast at about 2160° F. into a cast iron mould. In about two hours the temperature had fallen to about 1600° F. After a further 5 days it was about 580° F., at which temperature the matte was removed from the mould and cooled in air. The fully cooled matte was crushed, and then fed to a rod mill in closed circuit with a classifier. Grinding conditions were adjusted to give a classifier overflow containing about 38% by weight plus 325-mesh. A wet type magnetic separator removed magnetic material from the rod mill discharge. The magnetic and non-magnetic fractions thus produced contained precious metals as follows:

| | Weight, per cent | Platinum per cent recovery | Palladium per cent recovery | Gold per cent recovery |
|---|---|---|---|---|
| Magnetic | 24.1 | 97.3 | 97.4 | 87.2 |
| Non-magnetic | 75.9 | 2.7 | 2.6 | 12.8 |

Our invention is particularly applicable to the treatment of "Bessemer" or "converter" matte, hereinafter referred to as "Bessemer matte," which is produced by smelting ores of the Sudbury district and the like to produce a matte relatively low in copper and nickel and then oxidizing said low-grade matte in basic converters to remove iron, thus producing the Bessemer matte. Bessemer matte usually contains about 20–40% copper, about 40–60% nickel, about 17–23% sulfur, about 0.2–2.0% iron, about 0.1–3.0 ounces per ton of platinum group metals and gold, and traces of silica and other impurities.

It is to be noted that the sulfur content of the copper-nickel matte used in Example I illustrating the process was reduced to about 87.5% of the amount of sulfur necessary to combine with all the copper and nickel and the small amount of iron present to form $Cu_2S$, $Ni_3S_2$ and FeS. In other words, the amount of sulfur present was sufficient to combine with about 90% of the copper and about 87% of the nickel to form $Cu_2S$ and $Ni_3S_2$. Accordingly, about 10% of the copper and about 13% of the nickel theoretically was in the metallic state. This proportion of metallic copper and nickel was sufficient to provide satisfactory recovery of about 2.2 ounces of platinum group metals and gold per ton of matte. That is to say, the ratio of metallic copper and nickel to platinum group metals and gold was approximately 1100:1. Broadly speaking, satisfactory recoveries are obtained from mattes of the usual commercial grades when the ratio of the metallic copper-nickel alloy to the gold and precious metals present is not less than about 500:1. However, for mattes containing a large amount of platinum group metals and gold a ratio as low as 100:1 may be desirable.

In the case of mattes having higher combined platinum group metals and gold contents than that of the foregoing example it would, in order to produce non-magnetic copper and nickel sulfide as low in precious metals as was produced in the foregoing example, be necessary to produce a correspondingly higher proportion, i. e. more than 12.5%, of metallic alloy in the matte. In the case of mattes very high in platinum group metals and gold, i. e. those containing more than about 10 to 100 ounces platinum group metals and gold per ton, it would in many cases be more economical to carry out two or more successive treatments of the matte, in each of which the sulfur content is adjusted to result in the production of metallics equal to about 10% to 20% of the matte, than to attempt to make a satisfactory recovery in one stage.

In the case of low grade mattes, that is, mattes containing less than about 0.2 to 0.5 ounce platinum group metals and gold per ton, the most desirable amount of metallic constituent in the matte may be 5% or even lower.

Precious metals can by the present invention be economically recovered from mattes containing as little as .01 to .1 ounce of platinum group metals and gold per ton, especially in cases where the matte is in any event slowly cooled and comminuted for separation of copper from nickel by the processes of our co-pending applications Serial No. 527,510 and Serial No. 527,511, filed on March 21, 1944.

The novel process involving regulated slow cooling, comminution and magnetic separation for the concentration of platinum group metals and gold into a metallic-rich fraction is operative for nickel mattes essentially free of copper and for copper-nickel mattes substantially devoid of copper sulfide or containing up to at least 95% copper sulfide, subject to the limitations in sulfur content discussed hereinbefore.

When treating copper-nickel mattes containing less than about 28% nickel, the new process is operative either independently of the "bottoms" process, that is, when the sulfur content is such as not to permit the formation of two liquid immiscible phases, or in conjunction therewith. Those skilled in the art will recognize that two liquid immiscible phases are formed when mattes high in copper and of certain sulfur content are in the molten state. Mattes consisting almost entirely of copper and sulfur show immiscibility between about 3% and about 18% sulfur. With increasing nickel content up to about 28% nickel, the range of sulfur permitting immiscibility decreases and disappears at about 26% to about 28% nickel and about 12% sulfur. The bottoms process is operative only on mattes giving rise to liquid immiscibility. When the new process is operated in conjunction with the "bottoms" process, a portion of the precious metals is concentrated in the metallic bottom which is immiscible with the sulfide top. A further portion of the precious metals is then, by the present process, recovered in concentrated form in the metallics which can be magnetically separated from the sulfide top after comminution. The metallic bottom may be separated from the sulfide top either in the liquid state before slow cooling or in the solid state after slow cooling.

Since a high precious metals recovery can be obtained by the bottoms process alone in those cases where the matte is suitably high in copper, it is sometimes, especially when treating mattes low in platinum metals, not economical to supplement the bottoms process with the process of the present invention. However, when treating materials so rich in precious metals that a satisfactory recovery together with a satisfactory ratio of concentration cannot be achieved in a single operation by the bottoms process, our novel process may be used advantageously in conjunction with the bottoms process.

When treating mattes containing more than about 28% nickel, the bottoms process is entirely inoperative irrespective of the sulfur content, and the novel process of the present invention is alone operative.

We have discovered that when copper-nickel mattes containing from 0% to about 15% nickel and from about 18% to about 20% sulfur are slowly cooled, immiscible liquid metallic bottoms are sometimes formed during solidification of the matte, and that a concentration of precious metals occurs in the said immiscible bottoms. In other words, we have discovered that the operative range of the well known "bottoms" process can be extended by regulated slow cooling of the mass to include copper-nickel mattes containing from about 18% to about 20% sulfur and 0% to about 15% nickel. Normally (i. e., in the absence of regulated slow cooling) the "bottoms" process is operative only in the range from about 3% to a maximum of 18% sulfur.

In slowly cooled copper-nickel mattes of the usual sulfur content (18% to 25% sulfur) and containing more than about 10% copper, silver is found strongly concentrated into the copper sulfide constituent of the solidified mass. As a result, the metallic or magnetic portion separated from the comminuted matte is poorer in silver than is the non-magnetic sulfide portion. In other words, in mattes containing more than about 10% copper and containing about 18% to about 25% sulfur, the silver concentrates in the copper sulfide portion of the matte and may be recovered therefrom by the usual methods.

On the other hand, in nickel mattes or copper-nickel mattes containing less than about 10% copper, the silver tends to concentrate in the magnetic metallic-rich fraction rather than in the non-magnetic sulfide portion.

The following tabulation illustrates the results obtained by subjecting materials of various compositions containing platinum group metals, gold and silver to regulated slow cooling followed by comminution and separation of magnetics and bottoms when formed.

Since commercial mattes were used in several of the following examples, iron, silica and other impurities were present. Such impurities would influence the behaviors of the mattes to minor extents, but did not change the general picture as compared with masses containing only copper, nickel, sulfur and precious metals.

in addition a "bottom" is formed in which a substantial portion of the platinum and gold collects. The concentration of platinum, gold and silver in such "bottoms" is higher for each of these metals than is obtained by the separation of metallics or magnetics from comminuted mattes subjected to regulated slow cooling and comminution. The formation of "bottoms" in mattes such as these may be explained on the basis that during the regulated slow cooling of such mattes in accordance with the present invention there is a change in the composition of the liquid portion of the mass when primary $Cu_2S$ crystallizes out of solu-

| Matte No. | Approximate Composition of Charge [3] | | | | | | "Bottom" or Magnetics, Per Cent of Original Matte | Recovery into Bottoms or Magnetics, Per Cent | | | |
|---|---|---|---|---|---|---|---|---|---|---|---|
| | Per Cent | | | Oz./ton | | | | | | | |
| | Cu | Ni | S | Pt | Au | Ag | | Pt | Au | Ag | Pd |

TESTS COVERING WIDE RANGE OF COPPER TO NICKEL RATIOS. COOLED ABOUT 6 DAYS

| Matte No. | Cu | Ni | S | Pt | Au | Ag | "Bottom" | Pt | Au | Ag | Pd |
|---|---|---|---|---|---|---|---|---|---|---|---|
| 1 | .26 | 73.5 | 26.1 | .83 | 1.60 | .12 | Mags., 8.10 | 62.8 | 28.9 | 20.1 | |
| 2 | .13 | 77.7 | 22.1 | .50 | 1.59 | .21 | Mags., 21.15 | 95.2 | 51.2 | 59.8 | |
| 3 | 9.8 | 67.5 | 22.2 | .46 | 2.12 | 2.87 | Mags., 18.7 | 81.2 | 59.2 | 33.9 | |
| 4 [2] | 26.3 | 51.4 | 21.5 | .81 | .16 | 3.83 | Mags., 24.1 | 97.4 | 87.2 | 22.4 | 97.3 |
| 5 | 74.5 | 5.3 | 19 | .66 | 1.63 | 9.13 | Mags., 2.76 | 23.0 | 37.8 | 1.6 | |
| | | | | | | | Btm., .286 | 49.2 | 18.4 | .2 | |
| | | | | | | | Total | 72.2 | 56.2 | 1.8 | |
| 6 | 76.6 | 2.50 | 19.5 | .56 | 1.62 | 2.64 | Mags., .37 | 4.0 | 2.1 | .51 | |
| | | | | | | | Btm., .51 | 78.3 | 35.1 | .55 | |
| | | | | | | | Total | 82.3 | 37.2 | 1.06 | |

TESTS ON "BOTTOMS" PROCESS. COOLED IN ABOUT ½ HOUR

| Matte No. | Cu | Ni | S | Pt | Au | Ag | "Bottom" | Pt | Au | Ag | Pd |
|---|---|---|---|---|---|---|---|---|---|---|---|
| 7 | 77.3 | 5.2 | 16.5 | .78 | 1.87 | | Btm., 17.9 | 89.5 | 90.4 | | Pt+Au |
| 8 | 62.0 | 22.0 | 16.0 | 2.3 | .56 | 19.4 | Btm., 54.8 | 95.0 | 93.7 | 53.9 | 94.7 |

TESTS ON ADDITIONS OF COBALT, IRON AND LEAD SULFIDES TO COPPER-NICKEL BESSEMER MATTE. COOLED 6 DAYS

| Matte No. | | Pt | Pd | Au | Ag | | Pt | Pd | Au | Ag |
|---|---|---|---|---|---|---|---|---|---|---|
| 9 | 20% cobalt sulfide | 1.00 | .49 | .17 | 4.03 | Mags., 14.4 | 99.1 | 88.1 | 74.0 | 9.8 |
| 10 | 20% iron sulfide (FeS) | .62 | .32 | .14 | 4.36 | Mags., 53.4 | 98.1 | 98.3 | 93.4 | 41.8 |
| 11 | 50% iron sulfide (FeS) | .36 | .20 | .09 | 3.25 | Mags., 23.9 | 98.9 | 97.7 | 83.1 | 25.6 |
| 12 | 20% lead sulfide | .54 | .33 | .12 | 4.25 | Mags., 5.77 | 30.6 | 12.0 | 38.0 | 4.6 |

[1] Approximate.
[2] Test on 5 tons of matte containing also Fe 1% and Pd .51 oz. per ton.
[3] Balance iron, silica and other impurities.

Tests 1, 2 and 3 illustrate the treatment of mattes having a very small copper content and make it manifest that the platinum group metals and gold can be effectively concentrated by the present process when treating mattes containing as little as 0.13% copper. In other words, the present process is operative for mattes substantially devoid of copper. Tests 1 and 2 further show that when essentially copper-free mattes are treated in accordance with the principles of the present invention, silver is concentrated into the magnetic portion as strongly as is gold.

Test 4 is typical of the excellent results obtained by treating a representative Bessemer matte from Sudbury ore in accordance with the teachings of the present invention, using commercial or semi-commercial sized equipment.

Tests 5 and 6 are illustrative of the results obtained with mattes low in nickel. Since the sulfur content of these mattes is greater than about 18%, no "bottom" would normally be expected to form when the matte is liquid or is solidified at normal rates. However, as these tabulations make manifest, when such mattes low in nickel content are subjected to regulated slow cooling, a metallic-rich material separable by magnetic separation following comminution is obtained and tion with the result that a "bottom" is formed.

It will be noted that, when treating mattes containing more than about 10% of copper as in tests 4, 5 and 6, the silver shows little tendency to be concentrated into the magnetic fraction of the matte or into the bottom, if one is formed, whereas the gold is strongly concentrated into said magnetic fraction.

Tests 7 and 8 are illustrative of the results obtained when applying the principles of the conventional "bottoms" process which does not involve regulated slow cooling as does the present invention. Gold was strongly concentrated into the "bottoms" although on the average not to as great an extent as platinum. Silver, on the other hand, showed little tendency to concentrate into the "bottoms." With respect to test 7, the residual gold and platinum present after removal of the liquid bottom were worth roughly $10.00 per ton. Thus, the matte remaining could be economically treated in accordance with the principles of the present invention to recover said residual values. Although the recovery by the "bottoms" process was higher in test 8 than in test 7, sufficient gold and precious metals remained after removal of the liquid bottom to render recovery thereof worthwhile by using our novel process.

The present process is operative for copper-nickel mattes containing substantial proportions of cobalt, iron and lead sulfides. Mattes containing as much as about 20% cobalt sulfide or about 20% to about 50% iron sulfide as FeS can be treated by the present process with substantially no reduction in the recovery of the platinum group metals and gold.

In each of tests 9, 10 and 11, 93.2%, 97.7% and 96.3% of the platinum metals and gold present in the matte were recovered in the magnetic fractions equal respectively to 14.4%, 53.4% and 23.9% by weight of the original matte. On the other hand, lead sulfide in an amount of 20% of the total weight of the matte has a detrimental effect on the recovery of the platinum group metals and gold. This is illustrated by the results obtained and tabulated hereinbefore as test 12. However, in the presence of lesser amounts of lead sulfide, satisfactory recoveries of platinum group metals and gold can be obtained.

In the above-mentioned examples in which cobalt, iron and lead sulfides were present in the matte from which precious metals were concentrated by the novel process, the cobalt, iron and lead were found partially in the magnetic fraction and partially in the non-magnetic fraction. However, the preferred range of sulfur deficiency below that theoretically necessary to combine with all the metals present is not affected by the presence of cobalt or iron. Cooling rates suitable for pure copper-nickel mattes are also suitable when substantial quantities of iron or cobalt are present.

The drawing is a flow sheet depicting various embodiments of the invention described hereinbefore. The solid routing lines indicate the preferred sequence of operations and the dashed routing lines indicate various modifications thereof contemplated within the scope of the invention.

In the appended claims, the phrase "precious metals" refers to the platinum group metals and gold.

Furthermore, the term "base metals" will be understood to include copper, nickel, iron, cobalt and lead together with small quantities of the impurities usually encountered in mattes.

The expression "untreated matte" is to be understood as defining a mixture or chemical combination of the base metals just enumerated with sulfur containing, at the most, an amount of iron equivalent to about 50% iron sulfide, an amount of cobalt equivalent to about 20% cobalt sulfide and an amount of lead equivalent to about 20% lead sulfide, said mixture or chemical compound also containing at least about .01 ounce of precious metals per ton.

Although the present invention has been described in conjunction with certain preferred embodiment thereof, those skilled in the art will readily understand that modifications and variations thereof can be made. Such modifications and variations are to be considered within the purview of the specification and the scope of the appended claims.

We claim:
1. A process for concentrating precious metals in a mass consisting essentially of nickel, copper, precious metals and sulfur which comprises slowly cooling a molten mass consisting essentially of nickel, copper, precious metals and sufficient sulfur to combine with about 75% to about 95% of all the base metals present in said mass until substantially complete solidification occurs whereby a solidified mass comprising a mixture of about 5% to about 25% metallic grains and the balance essentially sulfide grains is obtained; comminuting the solidified mass; separating metallic particles from the sulfides; fusing said metallic particles using a sufficient amount of green furnace matte so that after Bessemerizing the mass to remove iron about 80% to about 95% of the metallic particles will have been converted to sulfides; slowly cooling the Bessemerized molten mass to the state of substantially complete solidification; comminuting the solidified mass; and separating said solidified mass into metallic and sulfide fractions; precious metals being concentrated in said metallic fraction.

2. A process for concentrating precious metals in a mass consisting essentially of nickel, copper, precious metals and sulfur which comprises slowly cooling a molten mass consisting essentially of nickel, copper, precious metals and sufficient sulfur to combine with about 80% to about 90% of the base metals present in said mass until substantially complete solidification occurs whereby a solidified mass comprising a mixture of about 10% to about 20% metallic grains and the balance essentially sulfide grains is obtained; comminuting the solidified mass; separating metallic particles from the sulfides; fusing said metallic particles with a sufficient amount of green furnace matte so that after Bessemerizing the mass to remove iron about 80% to about 95% of the metallic particles will have been converted to sulfides; slowly cooling the Bessemerized molten mass to the state of substantially complete solidification; comminuting the solidified mass; and separating said solidified mass into metallic and sulfide fractions, precious metals being concentrated in said metallic fraction.

3. A process for concentrating precious metals in a mass consisting essentially of nickel, copper, precious metals and sulfur which comprises slowly cooling a molten mass consisting essentially of nickel, copper, precious metals and sufficient sulfur to combine with about 75% to about 95% of the base metals present in said mass until substantially complete solidification occurs whereby a solidified mass comprising a mixture of about 5% to about 25% metallic grains and the balance essentially sulfide grains is obtained, comminuting the solidified mass, separating metallic particles from the sulfides, fusing said metallic particles with the addition of sufficient sulfur to convert about 80% to about 95% of said metallic particles to sulfides, slowly cooling the resultant molten mass to the state of substantially complete solidification, comminuting the recrystallized mass, and separating said recrystallized mass into a metallic fraction and a sulfide fraction, precious metals being concentrated in said metallic fraction.

4. A process for concentrating precious metals in a molten mass consisting essentially of nickel, copper, precious metals and sulfur which comprises regulating the sulfur content of said molten mass to an amount sufficient to furnish therein a quantity of base metal uncombined with sulfur in a ratio of at least about 100 to 1 with respect to the precious metals therein, crystallizing said molten mass by slow cooling thereof whereby a solidified mass comprising a mixture of sulfide and metallic grains is obtained, comminuting the solidified mass, and separating the metallic particles from the sulfides, precious metals being concentrated in said metallic particles.

5. A process for concentrating precious metals in a molten mass consisting essentially of nickel, copper, precious metals and about 75% to about 95% of the sulfur required to combine with all the copper and nickel present which comprises slowly cooling said molten mass to the state of substantially complete solidification, comminuting the solidified mass and separating the comminuted mass into a metallic fraction and a sulfide fraction, precious metals being concentrated into said metallic fraction.

6. A process for concentrating precious metals in a molten mass consisting essentially of nickel, copper, precious metals and about 80% to about 90% of the sulfur required to combine with all the copper and nickel present which comprises slowly cooling said molten mass to the state of substantially complete solidification, comminuting the solidified mass and separating the comminuted mass into a metallic fraction and a sulfide fraction, precious metals being concentrated into said metallic fraction.

7. A process for concentrating precious metals in a molten mass containing up to about 15% nickel, about 3% to about 20% sulfur and the balance copper and impurities which comprises slowly cooling said mass from the fused state to a state of substantially complete solidification with formation of a metallic bottom and a sulfide top, separating said metallic bottom from said sulfide top, comminuting said sulfide top until about 5% to about 50% thereof is retained on a 325-mesh screen, and separating said comminuted sulfide top into a metallic fraction and a sulfide fraction, precious metals being concentrated into said metallic fraction.

8. A process for concentrating precious metals in a molten mass containing up to about 28% nickel, about 3% to about 18% sulfur and the balance copper and impurities which comprises slowly cooling said mass with formation of a metallic bottom and a sulfide top, the latter consisting of a mixture of sulfide and metallic grains, separating said metallic bottom from said sulfide top, recovering a portion of the precious metals from said metallic bottom, comminuting said sulfide top, and separating metallic particles from the sulfides, precious metals being concentrated in said metallic particles.

9. A process for concentrating precious metals which comprises establishing a molten mass consisting essentially of nickel, copper, precious metals and about 75% to about 95% of the sulfur necessary to combine with all the base metals present, cooling said molten mass from the fused condition over a period of about one day to about fifteen days until substantially complete solidification occurs, comminuting the solidified mass and separating said comminuted mass into metallic and sulfide fractions, precious metals being concentrated into said metallic fraction.

10. A process for concentrating precious metals which comprises establishing a molten mass consisting essentially of nickel, copper, precious metals and about 80% to about 90% of the sulfur required to combine with all the base metals present, slowly cooling said molten mass over a period of about 1 day to about 15 days to the state of substantially complete solidification, comminuting the solidified mass until about 5% to about 50% thereof is retained on a 325-mesh screen, and separating the comminuted mass into a metallic fraction and a sulfide fraction, precious metals being concentrated in said metallic fraction.

WILLIAM KELVIN SPROULE.
GEORGE ALAN HARCOURT.

REFERENCES CITED

The following references are of record in the file of this patent:

UNITED STATES PATENTS

| Number | Name | Date |
|---|---|---|
| 1,315,660 | Ferguson | Sept. 9, 1919 |